US011358063B2

(12) United States Patent
Ashoori et al.

(10) Patent No.: US 11,358,063 B2
(45) Date of Patent: Jun. 14, 2022

(54) GENERATION OF AUDIENCE APPROPRIATE CONTENT

(71) Applicant: International Business Machines Corporation, Armonk, NY (US)

(72) Inventors: Maryam Ashoori, Scarsdale, NY (US); Anamika Dayaram Singh, Chappaqua, NY (US); Priti Ashvin Shah, Basking Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/811,158

(22) Filed: Mar. 6, 2020

(65) Prior Publication Data

US 2021/0275928 A1 Sep. 9, 2021

(51) Int. Cl.
| | |
|---|---|
| A63F 13/79 | (2014.01) |
| G06F 16/48 | (2019.01) |
| G06F 16/435 | (2019.01) |
| H04N 21/475 | (2011.01) |
| H04N 21/478 | (2011.01) |
| H04N 21/4627 | (2011.01) |
| G06N 3/04 | (2006.01) |
| G06N 3/08 | (2006.01) |
| A63F 13/73 | (2014.01) |
| H04N 21/466 | (2011.01) |

(52) U.S. Cl.
CPC .............. *A63F 13/79* (2014.09); *A63F 13/73* (2014.09); *G06F 16/435* (2019.01); *G06F 16/48* (2019.01); *G06N 3/0454* (2013.01); *G06N 3/088* (2013.01); *H04N 21/4627* (2013.01); *H04N 21/4662* (2013.01); *H04N 21/4756* (2013.01); *H04N 21/4781* (2013.01); *A63F 2300/201* (2013.01); *A63F 2300/5546* (2013.01)

(58) Field of Classification Search
None
See application file for complete search history.

(56) References Cited

U.S. PATENT DOCUMENTS

| | | | |
|---|---|---|---|
| 7,437,290 B2 | 10/2008 | Danieli | |
| 8,913,188 B2 | 12/2014 | Ayoub et al. | |
| 9,980,004 B1 | 5/2018 | Ericson | |
| 2006/0095262 A1* | 5/2006 | Danieli | ................... G10L 15/08 704/251 |
| 2012/0033133 A1 | 2/2012 | Bishop et al. | |
| 2012/0331167 A1* | 12/2012 | Hunt | .................. H04N 21/6334 709/231 |

(Continued)

OTHER PUBLICATIONS

More, M.D., et al, "Seamless Nudity Censorship: an Image-to-Image Translation Approach based on Adversarial Training," IJCNN, Jun. 2018,Rio de Janeiro, Brazil. 8 pages.

(Continued)

*Primary Examiner* — Jason T Yen
(74) *Attorney, Agent, or Firm* — Scully, Scott, Murphy & Presser, P.C.; Daniel P. Morris

(57) ABSTRACT

Multimedia content to be played on a multimedia player device can be received. Whether the multimedia content contains audience-inappropriate content can be determined. Replacement content corresponding to the audience-inappropriate content can be generated. The generated replacement content can be caused to play on the multimedia player device in lieu of the audience-inappropriate content.

20 Claims, 4 Drawing Sheets

(56) References Cited

U.S. PATENT DOCUMENTS

| | | | |
|---|---|---|---|
| 2015/0195616 | A1 | 7/2015 | Espinosa et al. |
| 2016/0323643 | A1* | 11/2016 | Panchaksharaiah ........................ H04N 21/4753 |
| 2017/0132495 | A1* | 5/2017 | Feris ...................... G11B 27/28 |
| 2020/0078689 | A1* | 3/2020 | Eatedali ................ G06T 19/006 |
| 2020/0186897 | A1* | 6/2020 | Dareddy .................. A63F 13/40 |
| 2020/0279122 | A1* | 9/2020 | Lee .......................... G06T 5/50 |
| 2020/0302667 | A1* | 9/2020 | del Val Santos ....... G06N 3/088 |
| 2021/0035599 | A1* | 2/2021 | Zhang .................. H04N 21/251 |
| 2021/0090314 | A1* | 3/2021 | Hussen Abdelaziz ...................... G06T 13/205 |
| 2021/0117773 | A1* | 4/2021 | Sollami ................ G06K 9/6218 |

OTHER PUBLICATIONS

Goodfellow, et al., "Generative Adversarial Networks," arXiv preprint arXiv:1406.2661, Jun. 10, 2014. pp. 1-9.

Wikipedia, "Deepfake," https://en.wikipedia.org/wiki/Deepfake, last edited on Jan. 13, 2020, 13 pages.

Duarte, et al., "Wav2Pix: Speech-conditioned Face Generation using Generative Adversarial Networks," ICASSP, published in 2019, accessed on Jan. 13, 2020. https://imatge-upc.github.io/wav2pix/, 6 pages.

Donahue, et al., "Adversarial Audio Synthesis," https://arxiv.org/abs/1802.04208. Feb. 9, 2019. pp. 1-16.

Haidar et al, "TextKD-GAN: Text Generation using Knowledge Distillation and Generative Adversarial Networks," https://arxiv.org/abs/1905.01976. Apr. 23, 2019. 12 pages.

Chatterjee, S., "Summarizing Popular Text-to-Image Synthesis Methods with Python Comparative Study of Different Adversarial Text to Image Methods." https://towardsdatascience.com/summarizing-popular-text-to-image-synthesis-methods-with-python-dc12d0075286. Jul. 2, 2019. 20 pages.

Zhu et al, "DM-GAN: Dynamic Memory Generative Adversarial Networks for Text-to-Image Synthesis." https://arxiv.org/abs/1904.01310. Apr. 2, 2019. pp. 1-9.

kaggle.com, "Toxic Comment Classification Challenge Identify and classify toxic Online comments." https://www.kaggle.com/c/jigsaw-toxic-comment-classification-challenge. 2018, accessed on Feb. 21, 2020. p. 1.

youtube.com, "[DataGrid] Model generation AI." https://www.youtube.com/watch?time_continue=6&v=8siezzLXbNo. Apr. 25, 2019. Accessed on Feb. 25, 2020. 2 pages.

Ogale, N., "A survey of techniques for human detection from video." https://pdfs.semanticscholar.org/d9f6/05a0875541cdccbd926e415c7cd50a32db08.pdf. Aug. 2008. 15 pages.

* cited by examiner

GENERATION OF AUDIENCE APPROPRIATE CONTENT

BACKGROUND

The present application relates generally to computers and computer applications, and more particularly to automatic detection and generation of audience appropriate content.

Content ratings (e.g., movie rating, video games rating) provide a basic guideline about the multi-media content, but sometimes such general rating may still not provide appropriate content to appropriate audience. For example, guardians or parents may want to have control over content (e.g., video games).

BRIEF SUMMARY

A computer-implemented method, in one aspect, can include receiving multimedia content to be played on a multimedia player device. The method can also include determining that the multimedia content contains audience-inappropriate content. The method can further include generating replacement content corresponding to the audience-inappropriate content. The method can also include causing the generated replacement content to play on the multimedia player device in lieu of the audience-inappropriate content.

A system can include a hardware processor and a memory device coupled with the hardware processor. The hardware processor can be configured to receive multimedia content to be played on a multimedia player device. The hardware processor can also be configured to determine that the multimedia content contains audience-inappropriate content. The hardware processor can also be configured to generate replacement content corresponding to the audience-inappropriate content. The hardware processor can also be configured to cause the generated replacement content to play on the multimedia player device in lieu of the audience-inappropriate content.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In embodiments, a system, method and technique are provided which generates an alternative audience appropriate multi-media segment in real time. The system, method and technique may use generative models and deep learning technology to generate such content. For example, a generative adversarial can be implemented to create alternative audience appropriate media segment or segments to replace sensitive content (or detected inappropriate content).

Figure 1:
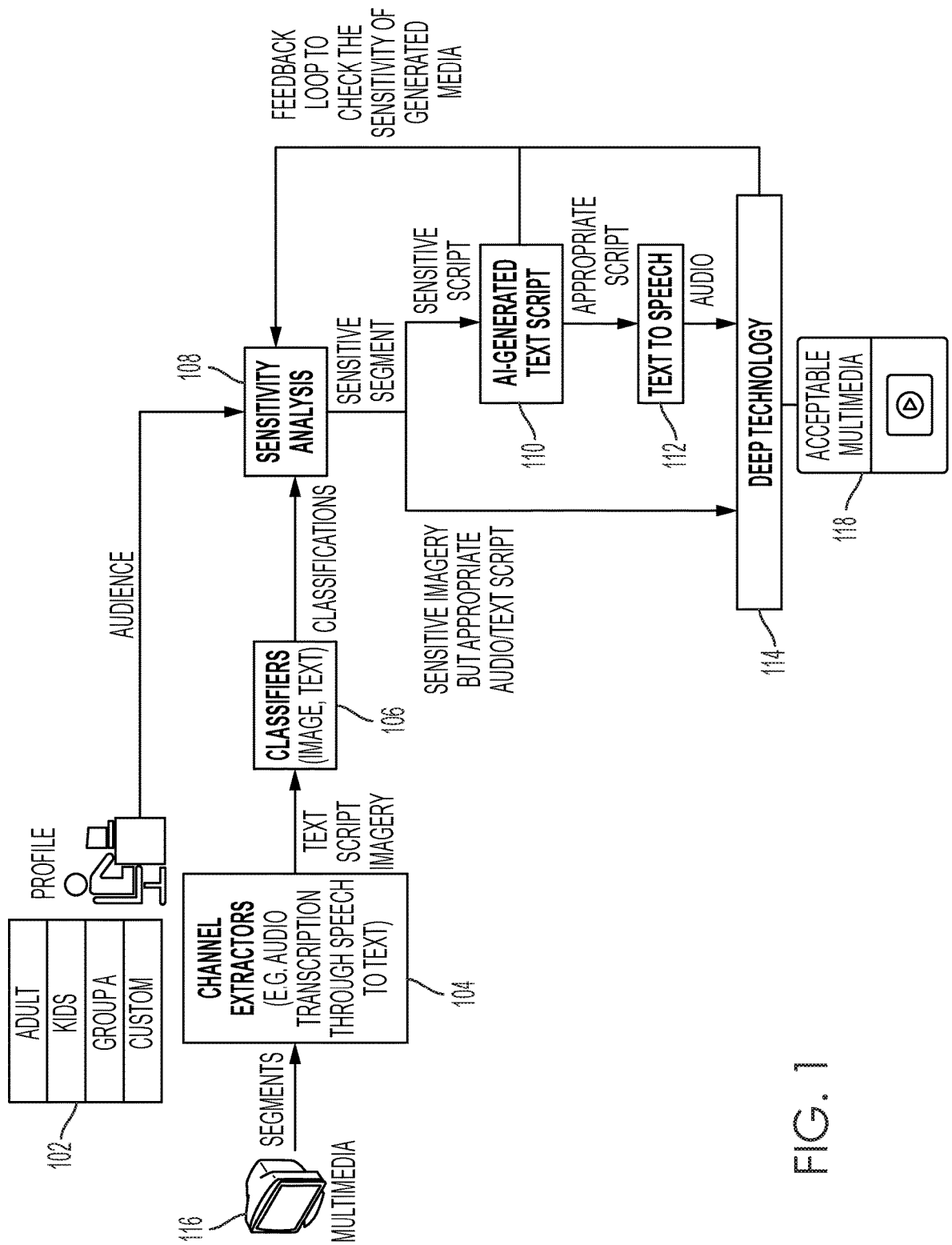
FIG. 1 is a diagram illustrating an overview of components of a system in an embodiment.

FIG. 1 is a diagram illustrating an overview of components of a system in an embodiment. The components shown include computer-implemented components, for instance, implemented and/or run on one or more processors or hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, audience-appropriate multimedia content can be generated in real-time to alter sensitive contents of a multi-media piece (e.g., movies, video games). The system, in an embodiment, flags as sensitive, inappropriate segments of the content, for example, taking into account the targeted audience. The system may, before a sensitive segment is played, perform an analysis of the audience to identify the level of sensitivity of the content for that given audience. The system regenerates an alternative content for that segment that is appropriate for the given audience and plays or presents that generated content instead. The system may implement generative models to regenerate such alternative content for that segment. For example, if the script of the segment is flagged as inappropriate (through an analysis of caption data, a speech to text on audio, video or image), a new script and/or new video can be generated for that segment to replace the sensitive content. In an aspect, a visual and audio content of that segment can be recreated also to synchronize with the recreated script.

At 102, a number of profiles can be created for the audience. The profiles can be generic such as "adult", "kindergartner", "pre-teen", "family", or custom defined. Profiles can be defined on a play device, or associated with a play device.

Multimedia content 116 is received. For example, multimedia content, which is triggered to be played on a device, can be intercepted. In an embodiment, the multimedia content can be handled as a whole or by segments. For instance, based on one or more factors such as the size of the multimedia content, availability of memory, speed of hardware, and/or another factor, the multimedia content can be processed as a whole by segments. For example, the multimedia content can be segmented into segments and the segments processed. While the following description refers to a "segment", a "segment" can be the whole multimedia content, if the multimedia content is being processed in the whole (e.g., based on one or more above factors). Either method can be used for implementation to emulate real time experience. At 104, the audio script and/or imagery of a segment of a multimedia content 116 are extracted. For instance, captions, if any, in the segment can be extracted. In addition, for instance, the natural language processing techniques like automatic caption generation and/or speech to text conversion can be used to extract the audio script from the scene, for example, if captions are not available. The extracted segment including text and/or image can be transmitted to a classifier.

Target audience's profile can also be received or retrieved. In an embodiment, the profile can be associated with the multimedia. For example, the profile can be associated with the multimedia content before the multimedia content is played by a user. As another example, the profile can be associated with the multimedia content at the time the multimedia content is played. One or more profiles shown at 102 can be received or retrieved.

At 106, for example, one or more classifiers are applied to the script and/or image of the segment to detect and flag a segment with potential sensitive content. For instance, an image classifier or classification algorithm can be used to classify inappropriate image content on the scene. Similarly, a text classifier or classification algorithm can be used to classify inappropriate language or audio in the segment. For example, a classifier may output a score associated with the content, which score can indicate a degree of appropriateness or inappropriateness. As another example, the classifier may output a score indicating how close the content is for appropriateness corresponding to the requested profile.

A segment determined to have inappropriate content can be flagged. For example, the segment can be tagged as having an inappropriate script (e.g., text, caption, audio), and/or inappropriate image and/or video. For instance, a segment content which has a score that exceeds a general threshold score can be flagged as being inappropriate.

At 108, a sensitivity analysis is conducted on the flagged segment to identify if the segment is inappropriate given the audience profile. For example, a sensitivity analysis is conducted on the classification results. Segments of the media content can be tagged as sensitive or non-sensitive based on the audience profile and the results of classification at 106. For example, the audience profile may indicate, for that particular audience, what type of content is considered inappropriate. The classification at 106 can classify the type of the inappropriate content, for example, by score. Based on matching the type of the inappropriate content and the audience profile indication, the media content segment can be tagged as being sensitive. As another example, the audience profile may indicate a threshold score for an inappropriate content for that particular audience. A classification algorithm or a classifier may output a score associated with inappropriate content. Based on the threshold score and the classifier's output score, a segment can be tagged sensitive or non-sensitive for that audience. For example, if the score exceeds that audience's threshold score, the segment can be tagged as sensitive for that audience.

At 110, if it is determined that the script of a segment is not appropriate for the given profile but the audio visual scene does not include sensitive content, the content of the media is altered for a replacement script for that segment. If the script of the segment is flagged as inappropriate, a new audience-appropriate script is generated. For example, a generative adversarial network (GAN) can be implemented to generate new audience-appropriate script. By way of example, the generated text script of the sensitive content can be automatically generated using AI technology (e.g., generative models, text generation) trained on historical data (e.g. movie scripts, novels, video games samples) and an analysis of context and events happening in the scene. The generated audio of the sensitive content can be automatically generated using AI technology (e.g., generative models, audio synthesis, face to speech technology). The generated imagery of the sensitive content can be automatically generated by using AI technology (e.g., generative models, image synthesis).

The new content can be generated offline or in real time. Training of the model (e.g., the GAN model) can be done ahead of time. Once the model or models are trained, the generation of the content can happen in real time. In another embodiment, a variation of content for sensitive segments can be automatically generated ahead of time and can be retrieved in real time as the media is streaming.

In an embodiment, for example, once a sensitive segment is up to play, before playing that scene, an alternate appropriate script can be generated using generative models. The generated script or text can be passed through the classifier to ensure it passes the sensitive score of the given audience profile. For example, there can be a feedback loop, where the generated script or text can be input to a classifier at 106 and the sensitivity analysis at 108 performed again using the generated script.

An embodiment of an implementation can include replacing the offensive or sensitive word with an accepted word. For example, responsive to determining that a script contains a sensitive word X and in the scene an actor says that word, the system can alter the sensitive word X to another word Y. If the segment contains a script or text, replacement script or text can be provided (e.g., word Y). In addition, if the segment involves imagery or video, the system can also recreate the lip movement and facial features of the character as if the actor said the word Y. With a similar approach the audio is synthesized to the voice of actor saying the word Y instead of X. Such processing can be implemented for more than a word, for example, for a sentence. For example, an alternative sentence can be generated and an entire original sentence can be replaced.

For example, at 112, if the segment has audio, the generative audio synthesis technology or another technique can be applied to generate the audio for the given text.

At 114, if the segment also includes imagery, the system can alter the visual content of the scene to reflect the new script. For example, using the deep learning technology, a video can be generated to mimic the actors saying out the new script. Another example is using text to image translation technology to create new imagery for the given script.

If it is determined that the script or text does not include inappropriate content for the target audience, but contains visual content (e.g., imagery or video) which is classified as being sensitive for that target audience, the system can generate a new imagery for that scene. For example, if the actor is not dressed appropriately, the imagery of the scene can be updated using a deep learning technology, generative models, and/or text to image translation to fix the dressing of the actor. In an embodiment, once a sensitive segment is up to play, before playing that scene, an alternate appropriate imagery can be generated, for example, using generative models and/or another technique. For example, if the visual content is flagged as sensitive but the audio script is clear (e.g., scenes that contains inappropriate visual content but main characters speak of weather forecast), new visual content can be generated for that segment based on an analysis of the audio or text script of the segment (for example, using text to image translation), the context, story, and the main event in that segment.

At 118, the replaced or alternate content is played or presented on the device, or caused to be played or presented on the device. In an embodiment, a warning sign or signal can be shown indicating that the audience is watching a synthetic video or listening to a synthetic audio.

Figure 2:
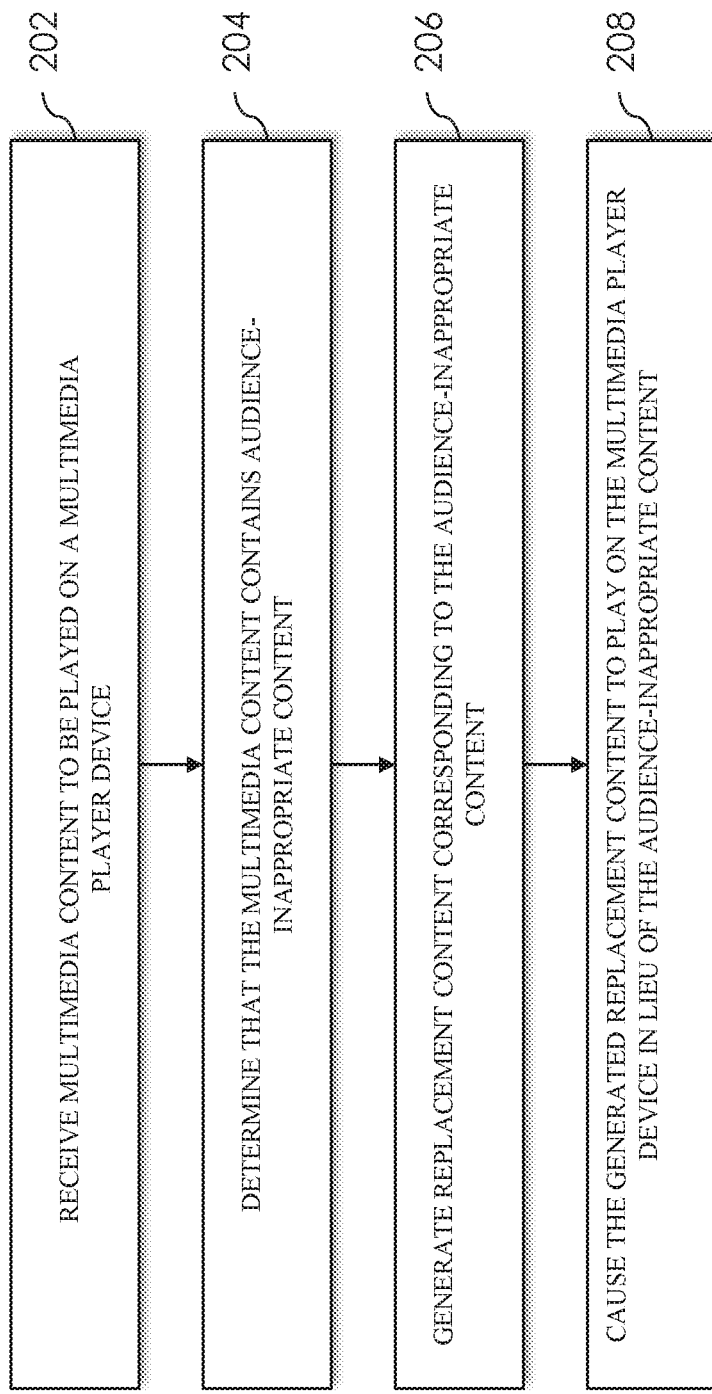
FIG. 2 is a flow diagram illustrating a method in an embodiment.

FIG. 2 is a flow diagram illustrating a method in an embodiment. At 202, the method includes receiving multimedia content to be played on a multimedia player device. A profile associated with a target audience can also be received.

At 204, the method includes determining that the multimedia content contains audience-inappropriate content. For example, the multimedia content can be passed to a machine learning classifier such as an artificial neural network trained to classify content propriety. The classifier may output a score associated with appropriateness of the content. There can be a number of classifiers, e.g., an image or video classifier, text or script classifier, audio classifier. Each classifier may process a different media of the multimedia content. Based on the score output by a classifier and the target audience profile, the method can determine whether the multimedia content contains audience-inappropriate content or content that is inappropriate for that target audience.

At 206, the method includes generating replacement content corresponding to the audience-inappropriate content. For instance, a machine learning or deep learning model such as a GAN model can be trained to generate the replacement content. The replacement content is generated, which would be audience-appropriate. The replacement content can also be passed through one or more classifiers to determine its appropriateness.

At 208, the method includes causing the generated replacement content to play on the multimedia player device in lieu of the audience-inappropriate content. The replacement content can be presented with a signal indicating that the replacement content is replacing an original content.

For example, a text or script classifier may be run to determine that the multimedia content includes a script determined to be inappropriate for a target audience, which script can be replaced with an alternative or replacement script generated to be appropriate for the target audience. In addition, a video content corresponding to the replacement script can also be generated, for example, the video content including an actor speaking the replacement script, and/or with facial expression corresponding to the replacement script.

A video or image classifier can be run to determine that the multimedia content includes a video content determined to be inappropriate for the target audience. In such a case, the replacement content can be generated that includes a replacement video content.

By way of example, if audio and/or text script is flagged as sensitive content (audience-inappropriate content) but the visual content is clear (not audience-inappropriate), the audio and/or text script can be replaced with a new script and the visual content can be synchronized to support that change, for example, facial expressions, lip movements.

In an embodiment, the replacement content can be automatically generated using artificial intelligence (AI) technology, e.g., generative models, text generation, audio synthesis, face to speech technology, and image synthesis, trained on historical data, e.g., movie scripts, novels, video games samples, celebrity images and audio samples, and an analysis of context and events happening in the scene.

In an embodiment, replacement audio content can be automatically generated using AI technology, e.g., generative models, audio synthesis, face to speech technology. In an embodiment, replacement imagery can be automatically generated by using AI technology, e.g., generative models, image synthesis.

In an embodiment, if the visual content is flagged as sensitive but the audio script is clear, new visual content can be generated for that segment of the multimedia content based on an analysis of the audio or text script of the segment, e.g., using text to image translation, the context, story, and the focus of the event in that segment.

Audience profiles can be categorized into different types or groups of audiences, and may be used to customize media content based on audience preferences such a clearance level, a replacement for confidential information.

In an aspect, the method may dynamically replace the audio and video depending upon the target audience settings and can be applicable for any type of streaming and/or multimedia files. Content such as text and video determined to be inappropriate for a target audience can be replaced by a generated suitable text and corresponding video generated video changes. The generated video and/or audio can vary with the selection of target audience, for example, based on the profile of the target audience.

Using facial recognition along with closed caption, the method can make the multimedia match the desired spoken words based on viewer parameters (e.g., desired movie rating).

The following illustrates a use case example. A and B are parents to C. The family is watching their favorite movie. A and B have activated the audience-appropriate content configuration on their playing device. There is an upcoming scene where the main character of the movie uses an offensive language to talk to his colleague. The method in an embodiment flags that scene as containing sensitive script for C. A new script, video, imagery and closed caption can be generated to replace the offensive language of that scene. The deep learning technology regenerates the imagery of that scene to be synchronized with the generated spoken script. The alternative content gets played as part of that scene.

Figure 3:
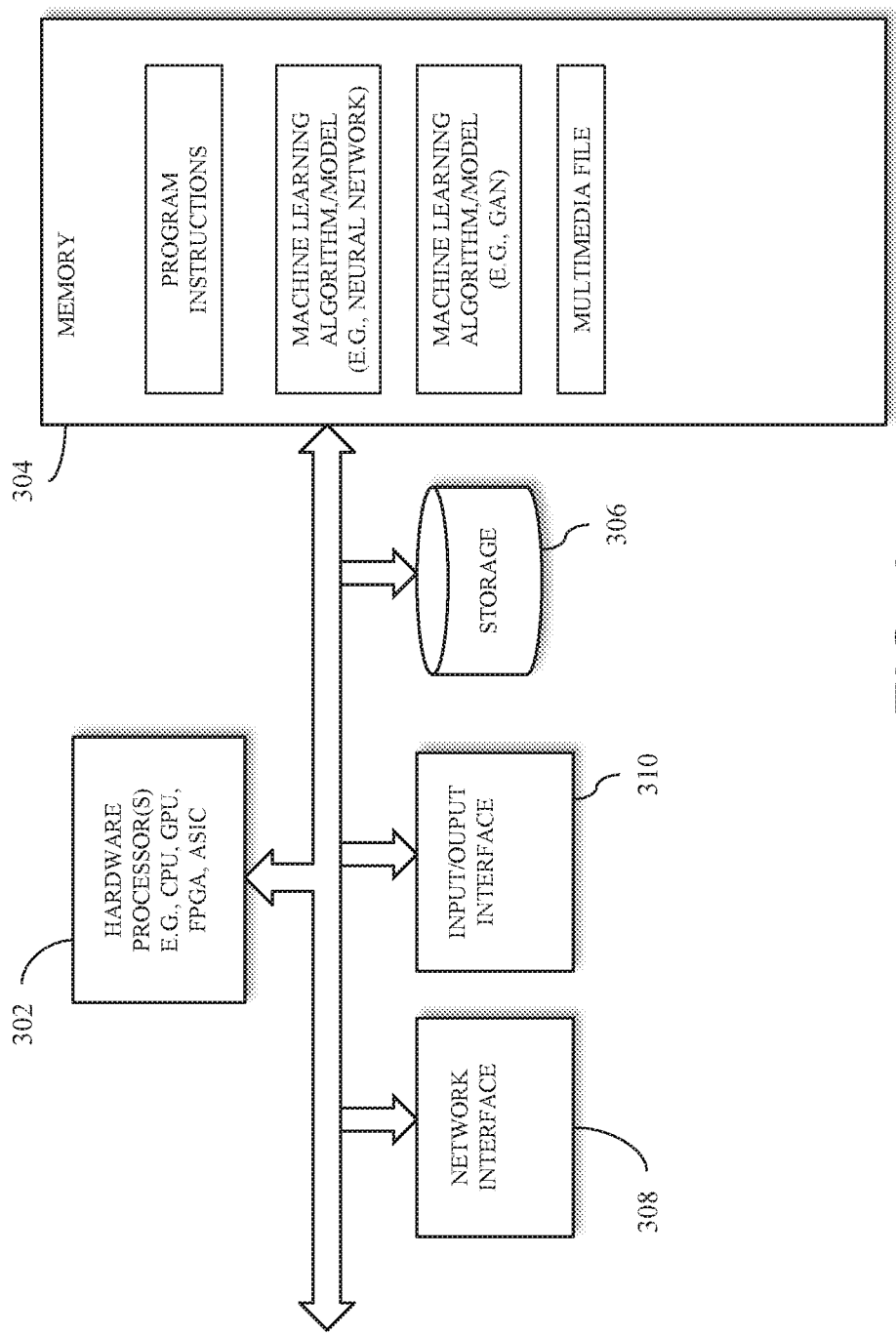
FIG. 3 is a diagram showing components of a system in one embodiment that can generate audience-appropriate content.

FIG. 3 is a diagram showing components of a system in one embodiment that can generate audience-appropriate content. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and generate a prediction model and recommend communication opportunities. A memory device 304 may include random access memory (RAM), read-only memory (ROM) or another memory device, and may store data and/or processor instructions for implementing various functionalities associated with the methods and/or systems described herein. One or more processors 302 may execute computer instructions stored in memory 304 or received from another computer device or medium. A memory device 304 may, for example, store instructions and/or data for functioning of one or more hardware processors 302, and may include an operating system and other program of instructions and/or data. One or more hardware processors 302 may receive multimedia content as input. Audience profile can also be received or retrieved. For instance, at least one hardware processor 302 may train one or more machine learning classification models to classify appropriateness of the multimedia content. The multimedia content can be passed to such one or more classifiers. In one aspect, such multimedia content and/or audience profile may be stored in a storage device 306 or received via a network interface 308 from a remote device, and may be temporarily loaded into a memory device 304. Another machine learning model such as, but not limited to, generative adversarial networks can be trained and run to generate a replacement content to replace portions or segments of the multimedia content determined to be audience-inappropriate. One or more classifiers, generator models such as GAN may be stored on a memory device 304, for example, for execution by one or more hardware processors 302. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 4:
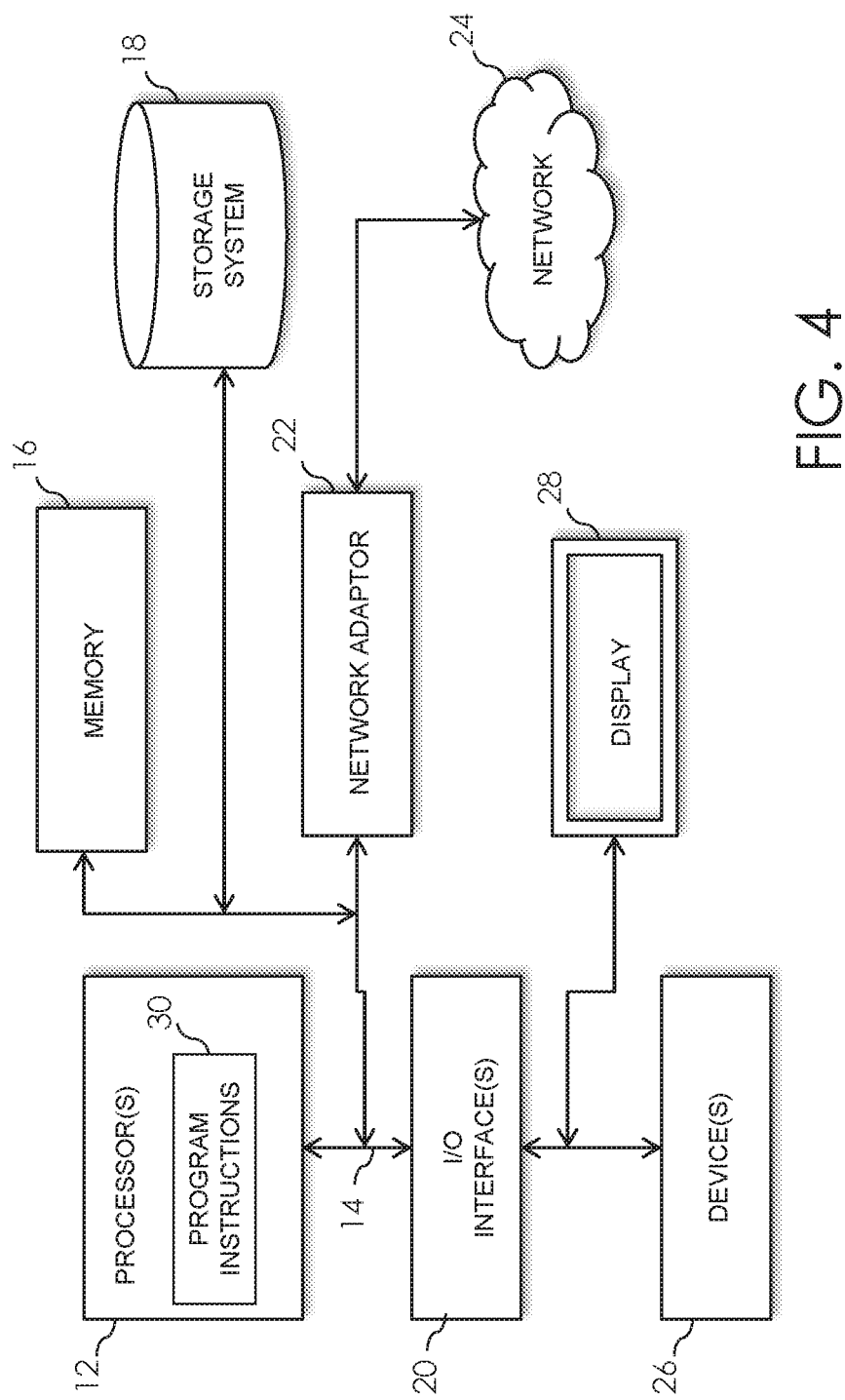
FIG. 4 illustrates a schematic of an example computer or processing system that may implement a system in one embodiment.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
receiving multimedia content to be played on a multimedia player device;
determining that the multimedia content contains audience-inappropriate content by at least passing audio content of the multimedia content to an audio classifier, passing video content of the multimedia content to a video classifier;
generating replacement content corresponding to the audience-inappropriate content, wherein responsive to determining that the audio content is inappropriate based on the audio classifier's score and a target audience profile, an audio stream is generated as replacement of the audio content and the generated replacement content is iteratively passed to the audio classifier until the audio classifier's score indicates appropriate content has been generated for the target audience profile, wherein responsive to determining that the video content is inappropriate based on the video classifier's score and the target audience profile, a visual content is generated as replacement of the video content and the generated replacement is iteratively passed to the video classifier until the video classifier's score indicates appropriate video content has been generated for the target audience profile,
wherein responsive to determining that the audio content is appropriate but the video content is inappropriate, the generated visual content being generated based on text of the audio content to imagery translation; and
causing the generated replacement content to play on the multimedia player device in lieu of the audience-inappropriate content.

2. The computer-implemented method of claim 1, wherein the method includes running an adversarial generative network (GAN) to generate the replacement content.

3. The computer-implemented method of claim 1, wherein determining that the multimedia content contains audience-inappropriate content includes determining that the multimedia content includes a script determined to be inappropriate for a target audience and replacing the script.

4. The computer-implemented method of claim 3, further including generating a video content corresponding to the replacement script, the video content including an actor's voice synthesized to speak the replacement script.

5. The computer-implemented method of claim 1, wherein determining that the multimedia content contains audience-inappropriate content includes determining that the multimedia content includes a video content determined to be inappropriate for a target audience, wherein the replacement content generated includes a replacement video content.

6. The computer-implemented method of claim 1, wherein the generated replacement content is passed through a machine learning classifier, to determine whether the generated replacement content is audience-appropriate.

7. The computer-implemented method of claim 1, the replacement content is presented with a signal indicating that the replacement content is replacing an original content.

8. A system comprising:
a hardware processor; and
a memory device coupled with the hardware processor;
the hardware processor configured to at least:
receive multimedia content to be played on a multimedia player device;
determine that the multimedia content contains audience-inappropriate content by at least passing audio content of the multimedia content to an audio classifier, passing video content of the multimedia content to a video classifier;
generate replacement content corresponding to the audience-inappropriate content, wherein responsive to determining that the audio content is inappropriate, an audio stream is generated as replacement of the audio content and the generated replacement content is iteratively passed to the audio classifier until the audio classifier's score indicates appropriate content has been generated for the target audience profile, wherein responsive to determining that the video content is inappropriate based on the video classifier's score and the target audience profile, a visual content is generated as replacement of the video content and the generated replacement is iteratively passed to the video classifier until the video classifier's score indicates appropriate video content has been generated for the target audience profile,
wherein responsive to determining that the audio content is appropriate but the video content is inappropriate, the generated visual content being generated based on the audio content's text to image translation; and
cause the generated replacement content to play on the multimedia player device in lieu of the audience-inappropriate content.

9. The system of claim 8, wherein the hardware processor is configured to run an adversarial generative network (GAN) to generate the replacement content.

10. The system of claim 8, wherein the hardware processor is configured to determine that the multimedia content includes a script determined to be inappropriate for a target audience and replace the script.

11. The system of claim 10, wherein the hardware processor is configured to generate a video content corresponding to the replacement script, the video content including an actor's voice synthesized to speak the replacement script.

12. The system of claim 8, wherein the hardware processor is configured to determine that the multimedia content segment includes a video content determined to be inappropriate for a target audience, wherein the replacement content generated includes a replacement video content.

13. The system of claim 8, wherein the generated replacement content is passed through a machine learning classifier, to determine whether the generated replacement content is audience-appropriate.

14. The system of claim 8, wherein the replacement content is presented with a signal indicating that the replacement content is replacing an original content.

15. A computer program product comprising a computer readable storage medium having program instructions embodied therewith, the program instructions executable by a device to cause the device to:
receive multimedia content to be played on a multimedia player device;
determine that the multimedia content contains audience-inappropriate content by at least passing audio content of the multimedia content to an audio classifier, passing video content of the multimedia content to a video classifier;

generate replacement content corresponding to the audience-inappropriate content, wherein responsive to determining that the audio content is inappropriate, an audio stream is generated as replacement of the audio content and the generated replacement content is iteratively passed to the audio classifier until the audio classifier's score indicates appropriate content has been generated for the target audience profile, wherein responsive to determining that the video content is inappropriate based on the video classifier's score and the target audience profile, a visual content is generated as replacement of the video content and the generated replacement is iteratively passed to the video classifier until the video classifier's score indicates appropriate video content has been generated for the target audience profile, wherein responsive to determining that the audio content is appropriate but the video content is inappropriate, the generated visual content being generated based on the audio content's text to image translation; and cause the generated replacement content to play on the multimedia player device in lieu of the audience-inappropriate content.

16. The computer program product of claim 15, wherein the device is caused to run an adversarial generative network (GAN) to generate the replacement content.

17. The computer program product of claim 15, wherein the device is caused to determine that the multimedia content includes a script determined to be inappropriate for a target audience and replace the script.

18. The computer program product of claim 17, wherein the device is caused to generate a video content corresponding to the replacement script, the video content including an actor's voice synthesized to speak the replacement script.

19. The computer program product of claim 15, wherein the device is caused to determine that the multimedia content segment includes a video content determined to be inappropriate for a target audience, wherein the replacement content generated includes a replacement video content.

20. The computer program product of claim 15, wherein the generated replacement content is passed through a machine learning classifier, to determine whether the generated replacement content is audience-appropriate.

* * * * *